US012691750B2

(12) United States Patent
Mitidieri et al.

(10) Patent No.: US 12,691,750 B2
(45) Date of Patent: Jul. 28, 2026

(54) EXTRUDED FLAP FOR A DEVICE FOR SHUTTING OFF AN AIR INLET OF A MOTOR VEHICLE FRONT END

(71) Applicant: VALEO SYSTEMES THERMIQUES, La Verriere (FR)

(72) Inventors: Enzo Mitidieri, La Verriere (FR); Laura Marion, La Verriere (FR)

(73) Assignee: Valeo Electrification, Cergy Pontoise (FR)

( * ) Notice: Subject to any disclaimer, the term of this patent is extended or adjusted under 35 U.S.C. 154(b) by 320 days.

(21) Appl. No.: 18/558,818

(22) PCT Filed: Apr. 12, 2022

(86) PCT No.: PCT/EP2022/059813
§ 371 (c)(1),
(2) Date: Nov. 3, 2023

(87) PCT Pub. No.: WO2022/233549
PCT Pub. Date: Nov. 10, 2022

(65) Prior Publication Data
US 2024/0227546 A1    Jul. 11, 2024

(30) Foreign Application Priority Data

May 3, 2021    (FR) ...................................... 2104653

(51) Int. Cl.
*B60K 11/08*        (2006.01)
(52) U.S. Cl.
CPC .................................. *B60K 11/085* (2013.01)
(58) Field of Classification Search
CPC .. B60K 11/085; B60K 11/08; B60Y 2410/113
See application file for complete search history.

(56) References Cited

U.S. PATENT DOCUMENTS

| | | | | |
|---|---|---|---|---|
| 5,921,028 | A | * | 7/1999 | Marocco |
| 10,100,707 | B2 | * | 10/2018 | Wolf |

(Continued)

FOREIGN PATENT DOCUMENTS

| | | | | |
|---|---|---|---|---|
| DE | 102017119098 A1 | * | 2/2019 | .......... F24F 13/1426 |
| FR | 3094284 A1 | | 10/2020 | |

(Continued)

OTHER PUBLICATIONS

Text translation of Klapper (DE-102017119098-A1) relied upon in the office action. (Year: 2019).*

(Continued)

*Primary Examiner* — James A Shriver, II
*Assistant Examiner* — Nicholas R. Kandas
(74) *Attorney, Agent, or Firm* — Valeo Electrification

(57)        ABSTRACT

A flap including an extruded flap body with two outer walls connected edge to edge and delimiting an inner cavity, the flap including an end piece at each of the ends of the flap body, the end pieces including an inner part inserted into the cavity and an outer part protruding from the flap body, the flap body including, within its cavity, two lateral walls connecting the inner faces of the outer walls, the inner part of at least one end piece including a first and a second oblique tooth projecting towards the outside of the inner part, the end of the first tooth being intended to come into contact with one lateral wall, and the end of the second tooth being intended to come into contact with the other lateral wall, the teeth being oriented so as to oppose the extraction of the end piece from the flap body.

19 Claims, 4 Drawing Sheets

(56) References Cited

U.S. PATENT DOCUMENTS

| | | | |
|---|---|---|---|
| 2021/0122098 A1 | 4/2021 | Herlem | |
| 2024/0131920 A1 | 4/2024 | Vacca et al. | |

FOREIGN PATENT DOCUMENTS

| | | | | |
|---|---|---|---|---|
| JP | 2019511408 A | 4/2019 | | |
| WO | 2018067288 A1 | 4/2018 | | |
| WO | 2019166729 A1 | 9/2019 | | |
| WO | WO-2020193892 A1 * | 10/2020 | .......... | B60K 11/085 |
| WO | 2021074506 A1 | 4/2021 | | |

OTHER PUBLICATIONS

Japan Patent Office, Office Action (with English translation) of corresponding Japanese Patent Application No. 2023-568139, dated Oct. 23, 2024.

Japan Patent Office, Search Report (with English translation) of corresponding Japanese Patent Application No. 2023-568139, dated Oct. 10, 2024.

European Patent Office, International Search Report (with English translation) and Written Opinion of corresponding International Application No. PCT/EP2022/059813, dated Aug. 2, 2022.

* cited by examiner

EXTRUDED FLAP FOR A DEVICE FOR SHUTTING OFF AN AIR INLET OF A MOTOR VEHICLE FRONT END

TECHNICAL FIELD

The present invention relates to a flap for a shutter device, and more specifically a device for shutting off an air inlet of motor vehicle front end.

BACKGROUND OF THE INVENTION

Motor vehicle front ends are generally made up of two main air inlets, referred to as the top route and the bottom route, separated by a bumper beam. The heat exchangers of the motor vehicle, such as the one used for the passenger compartment air conditioning and/or the one used for cooling the engine, for example, are generally placed behind this bumper beam.

It is also known practice to position, in the path of air passing through the main air inlets, more generally the bottom route, a support frame comprising a multiplicity of flaps mounted pivotably about parallel axes and suitable for adopting a multiplicity of different angular positions, between an open position and a shut-off position, under the action of an appropriate controller.

A shutter device resembling a louver blind is thus obtained that makes it possible to adjust the flow rate of air passing through the air inlets and arriving at the heat exchangers. It is thus possible to optimize the effectiveness of these heat exchangers, depending on the requirements, by varying the amount of air that they receive. In addition, at high speed, the flaps in the shut-off position make it possible to reduce the drag coefficient of the vehicle and thus improve the aerodynamics of said vehicle.

The flaps of such shutter devices can in particular comprise an extruded flap body at the ends of which are positioned end pieces allowing the connection to the support frame. However, in order for these end pieces to remain in place inside the flap body, or in order to prevent the end pieces from damaging the flap body when they are put in place, reduced manufacturing tolerances are necessary. This production quality is difficult to achieve and very costly due to the materials and dimensions of the parts.

BRIEF SUMMARY OF THE INVENTION

One of the aims of the present invention is therefore to at least partially overcome the drawbacks of the prior art by proposing a flap comprising an improved connection between the flap body and the end pieces.

The present invention therefore relates to a flap for a device for shutting off an air inlet of a motor vehicle front end, said flap comprising a profiled oblong flap body, obtained by extrusion and extending along its axis of rotation, said flap body comprising two outer walls connected edge-to-edge and defining an inner cavity, said flap further comprising at each end of the flap body an end piece, said end pieces comprising an inner portion inserted into the cavity of the flap body and an outer portion protruding from said flap body, the flap body comprising, inside its cavity, two reinforcing lateral walls extending parallel to the axis of rotation and connecting the inner faces of the outer walls, the inner portion of at least one end piece comprising at least one first and one second tooth that are oblique and protrude toward the outside of said inner portion, the end of the at least one first tooth being intended to come into contact with one lateral wall and the end of the at least one second tooth being intended to come into contact with the other lateral wall, the teeth being oriented so that they oppose the removal of the end piece from the flap body.

According to one aspect of the invention, the lateral walls divide the cavity of the flap body in three, a lateral channel at each edge of the transverse cross-section of the flap body and a central channel positioned between the two lateral channels, the inner portion of the end piece being positioned inside said central channel.

According to another aspect of the invention, the central channel comprises a reinforcing central wall extending along the axis of rotation and connecting the inner faces of the outer walls, said central wall separating the central channel in two, the inner portion of the end piece comprising a slot for inserting said central wall.

According to another aspect of the invention, the inner portion of the end piece comprises at least one support point on each of the inner faces of the outer walls forming the flap body.

According to another aspect of the invention, the inner portion of the end piece has a transverse cross-section the shape of which complements the shape of the cavity of the flap body.

According to another aspect of the invention, the inner portion of the end piece comprises blind recesses that face the inner faces of the outer walls when mounted in the flap body.

According to another aspect of the invention, the thickness of the sections forming the inner portion of the end piece varies by a value of less than 15% from one section to another.

According to another aspect of the invention, the inner portion of the end piece comprises a locating through-hole positioned asymmetrically on said inner portion.

According to another aspect of the invention, the end piece comprises, between its inner portion and its outer portion, a collar protruding perpendicular to the axis of rotation of the flap, said collar closing the end of the flap body.

According to another aspect of the invention, the flap comprises, at a first end thereof, an end piece comprising, on its outer portion, a pivot axis concentric with the axis of rotation and, at a second end, an end piece comprising a pivot axis concentric with the axis of rotation and a control arm.

BRIEF DESCRIPTION OF THE DRAWINGS

Further features and advantages of the invention will become more clearly apparent on reading the following description, which is given by way of non-limiting illustrative example, and from the appended drawings, in which.

DETAILED DESCRIPTION OF THE INVENTION

In the various figures, identical elements bear the same reference signs.

The following embodiments are examples. Although the description refers to one or more embodiments, this does not necessarily mean that each reference relates to the same embodiment, or that the features apply only to one single embodiment. Individual features of different embodiments can also be combined or interchanged to provide other embodiments.

In the present description, certain elements or parameters can be given ordinal numbers such as, for example, first element or second element, as well as first parameter and second parameter or even first criterion and second criterion, etc. In this case, this ordinal numbering is simply to differentiate between and denote elements or parameters or criteria that are similar but not identical. This ordinal numbering does not imply any priority of one element, parameter or criterion over another and such numbering can easily be interchanged without departing from the scope of the present description. Likewise, this ordinal numbering does not imply any chronological order, for example, in assessing any given criteria.

Figure 1:
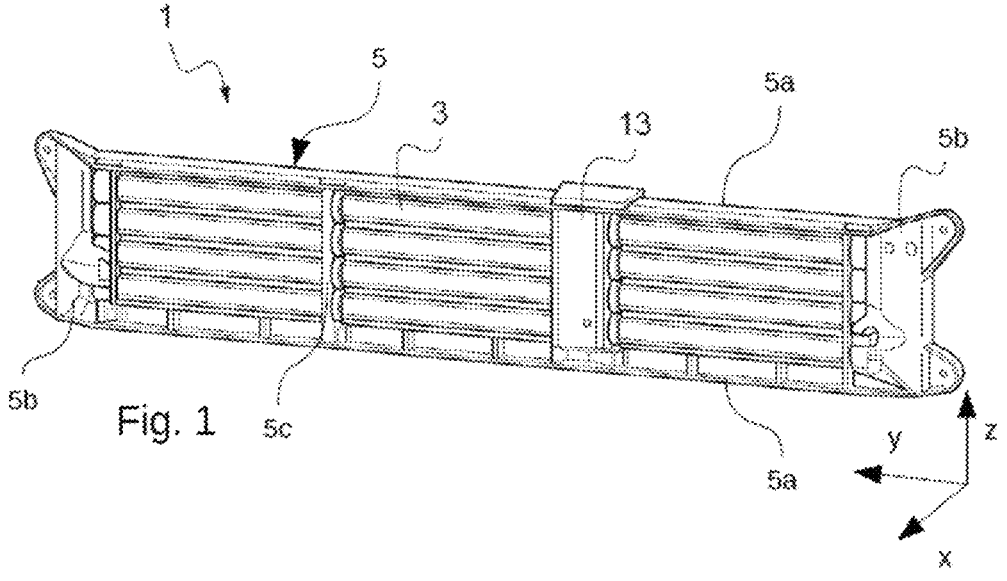
FIG. 1 shows a schematic perspective depiction of the front of a shutter device in the shut-off position.
Figure 2:
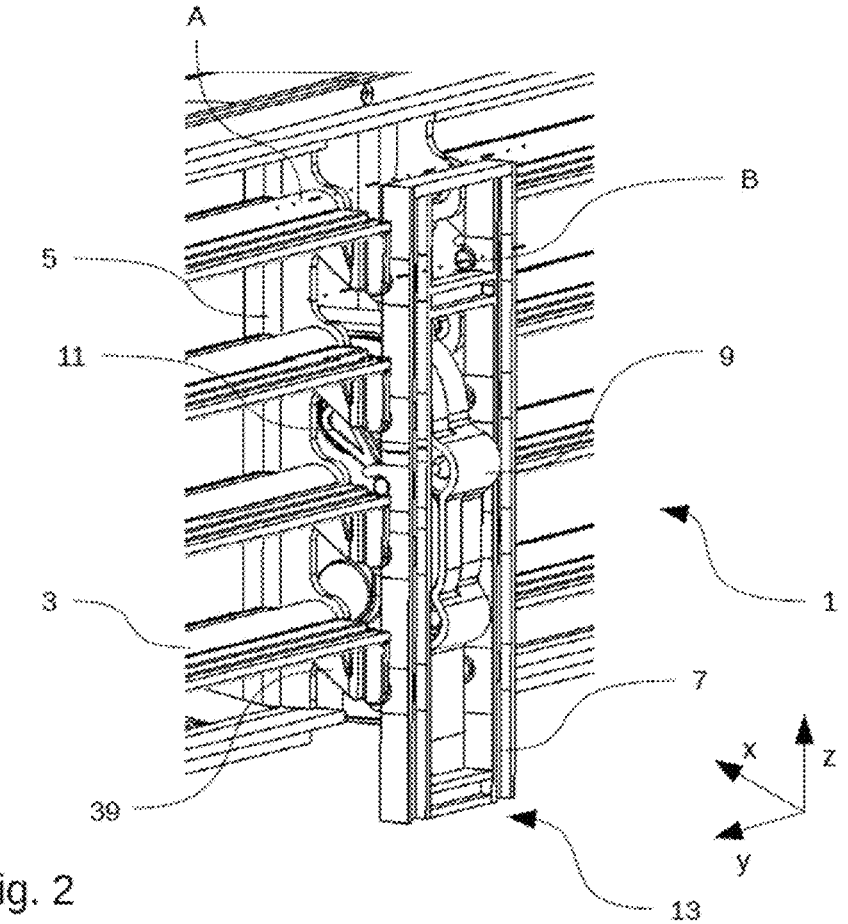
FIG. 2 shows a schematic perspective depiction of control element.

In FIGS. 1 and 2, a trihedron XYZ will be used in order to show the viewing angle of each of said figures relative to each other. The axes of this trihedron can also correspond to the different orientations of the motor vehicle. The X axis can thus correspond to the axis of the length of the vehicle, the Y axis to the axis of its width, and the Z axis to the axis of its height.

FIG. 1 shows a schematic perspective depiction of a shutter device in the shut-off position. This FIG. 1 more exactly shows the outer face of said shutter device 1, that is, the face directed toward the outside of the motor vehicle.

Said shutter device 1 comprises a support frame 5 comprising in particular two longitudinal crossmembers 5*a*, extending parallel to the Y axis of the trihedron, and at least two lateral uprights 5*b*, extending parallel to the Z axis of the trihedron and connecting said longitudinal crossmembers 5*a*. Advantageously, the support frame 5 is made from plastic and the two longitudinal crossmembers 5*a* and the at least two lateral uprights 5*b* are obtained by injection molding. In order to improve the stiffness of said support frame 5, it can be molded in one piece.

One or more flaps 3 are installed inside said support frame 5. When there is a plurality of flaps 3, they form rows of flaps 3 parallel to each other and forming a set of flaps 3. In the example illustrated in FIG. 1, the shutter device 1 comprises two sets of flaps 3, separated by a control module 13. The set of flaps 3 that is longest along the Y axis rests on an intermediate upright 5*c* positioned in the opening of the support frame 5 in order to limit the deformation of the flaps 3 under their own weight and the possible disengagement of their connections to the support frame 5 or the control module 13. This control module 13 is placed at one of the ends of the sets of flaps 3 so as to allow the synchronous rotation of said flaps 3 about a pivoting axis A.

This rotation takes place between an open position (not shown), in which the flaps 3 are positioned so that an air flow can pass through the shutter device 1, in particular inside the support frame 5, and a shut-off position illustrated in FIG. 1, in which the flaps 3 are arranged so that an air flow cannot pass through the shutter device 1.

In the example shown in FIG. 1, the control module 13 is positioned in the opening of the support frame 5 and is connected to two sets of flaps 3 positioned on either side of said control module 13. It is however entirely possible to envisage that the control module 13 be positioned on one of the lateral uprights 5*b* and thus only be connected to a single set of flaps 3.

As shown in FIG. 2, the control element 13 comprises in particular a rod 7. The flaps 3 comprise a control arm 39 that is perpendicular to their pivoting axis A and bears a connection stud along a connection axis B. The connection stud allows the connection between the flap 3 and the rod 7. The pivoting axis A and the connection axes B are not coincident and are both parallel to the Y axis of the trihedron.

The control module 13 also comprises an actuator 9. The actuator 9 can be electric, such as for example an electric motor, or pneumatic, such as for example a pneumatic cylinder. Said actuator 9 applies a translational movement along the Z axis of the trihedron to the rod 7, by pivoting of a lever 11.

The flaps 3 can each pivot about a pivoting axis A defined by their connection to the support frame 5. The connection studs between the flaps 3 and the control rod 7 are off-center relative to the pivoting axes A such that a translational movement of the control rod 7 parallel to the Z axis of the trihedron, under the action of the actuator 9, causes the flaps 3 to pivot about their respective pivoting axes A and therefore causes said flaps 3 to pass from one position to another. Since the flaps 3 are connected to the same rod 7, the passage from an open position to a shut-off position is synchronous for all of said flaps 3.

Figure 3:
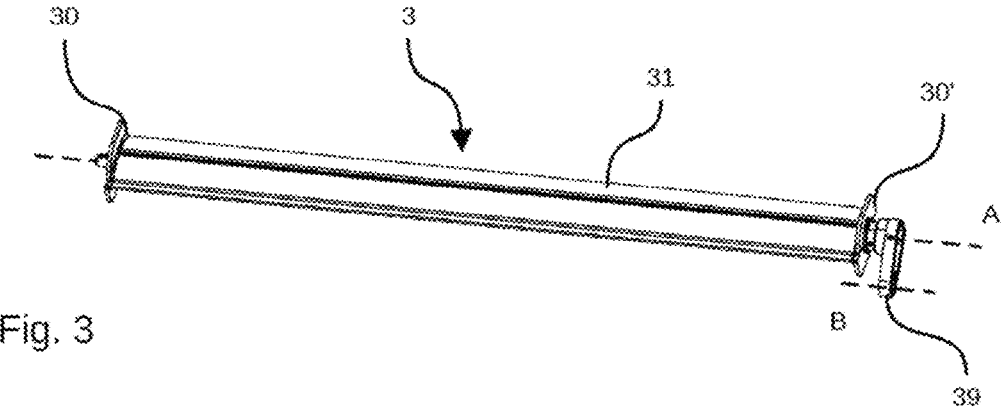
FIG. 3 shows a schematic perspective depiction of a flap.

As shown in FIG. 3, a flap 3 comprises a profiled oblong flap body 31, obtained by extrusion and extending along its axis of rotation A. The transverse cross-section of the flap body 31 can more particularly have a substantially oval profile (see FIG. 4).

End pieces 30, 30' are positioned at each end of the flap body 31. In the present case, the ends in question are the ends in the longitudinal direction of the flap body 31. These end pieces 30, 30' make it possible in particular to close the flap body 31 obtained by extrusion and also allows the connection of the flap 3 to the support frame 5 and the control module 13. The end piece 30' intended to be connected to the control module 13 comprises in particular the control arm 39 allowing the connection to the rod 7 (see FIGS. 2 and 3).

Figure 4:
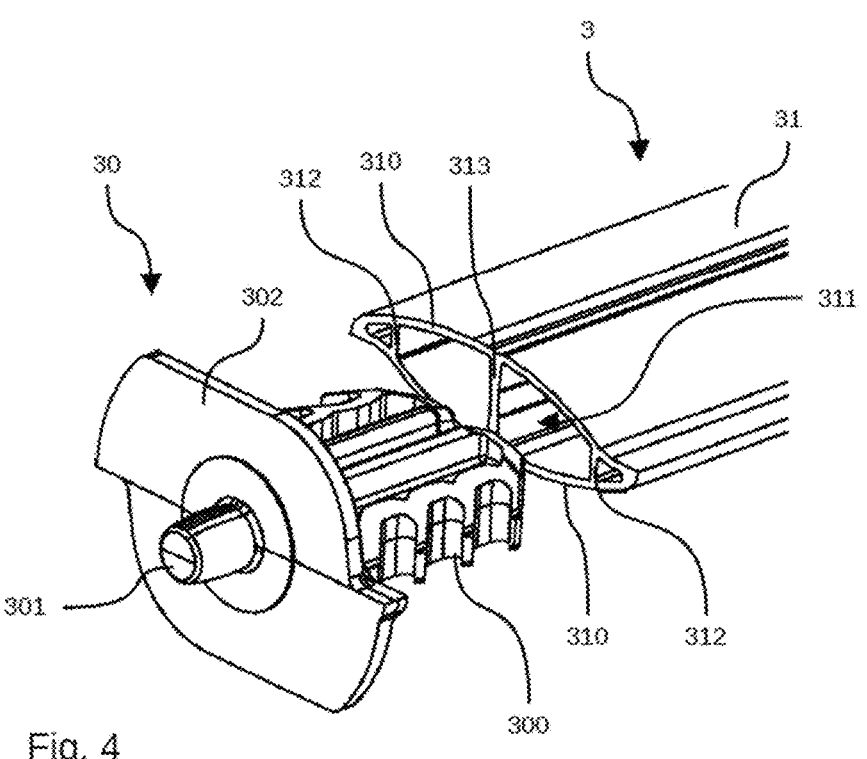
FIG. 4 shows an exploded schematic perspective depiction of a flap end.

As shown in FIG. 4, the flap body 31 comprises two outer walls 310 connected edge-to-edge and defining an inner cavity 311. These two outer walls 310 more exactly form the outer structure of the flap body 31. Because the flap body 31 is produced by extrusion, the inner cavity 311 extends over the entire length thereof. The flap body 31 more particularly comprises, inside its cavity 311, two reinforcing lateral walls 312 extending parallel to the axis of rotation A and connecting the inner faces of the outer walls 310. These lateral walls 312 make it possible in particular to stiffen the structure of the flap body 31. These lateral walls 312 can in particular be straight and parallel to each other. The lateral walls 312 can divide the cavity 311 of the flap body 31 in three and form a lateral channel at each edge of the transverse cross-section of the flap body 31 and a central channel positioned between said two lateral channels.

The end pieces 30, 30' comprise an inner portion 300 inserted into the cavity 311 of the flap body 31 and an outer portion 301 protruding from said flap body 31. The end pieces 30, 30' can also comprise, between their inner portion 300 and their outer portion 301, a collar 302 protruding perpendicular to the axis of rotation A of the flap 3. This collar 302 in particular closes the end of the flap body 3. The collar 302 also makes it possible to protect the support frame 5 and the control module 13 from water or dust that could reach the flap body 31.

At a first end of the flap body 31 illustrated in FIG. 4, the flap 3 comprises in particular an end piece 30 comprising, on its outer portion 301, a pivot axis concentric with the axis of rotation A, intended to interact with a bearing borne by the support frame 5. At a second end of the flap body 31 (visible in FIG. 2), the flap 3 comprises another end piece 30' comprising a pivot axis concentric with the axis of rotation A, intended to interact with a bearing borne by the control module 13 and the control arm 39. The inner portion 300 of the end pieces 30, 30' can more particularly be positioned inside the central channel of the flap body 31. The end pieces 30, 30' are preferably made from plastic by injection molding.

Figure 5:
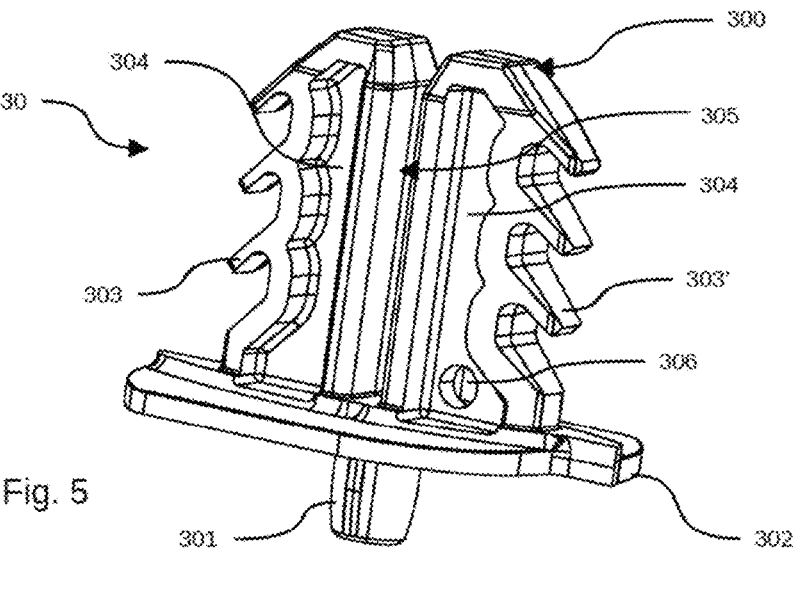
FIG. 5 shows a schematic perspective depiction of an end piece.
Figure 6:
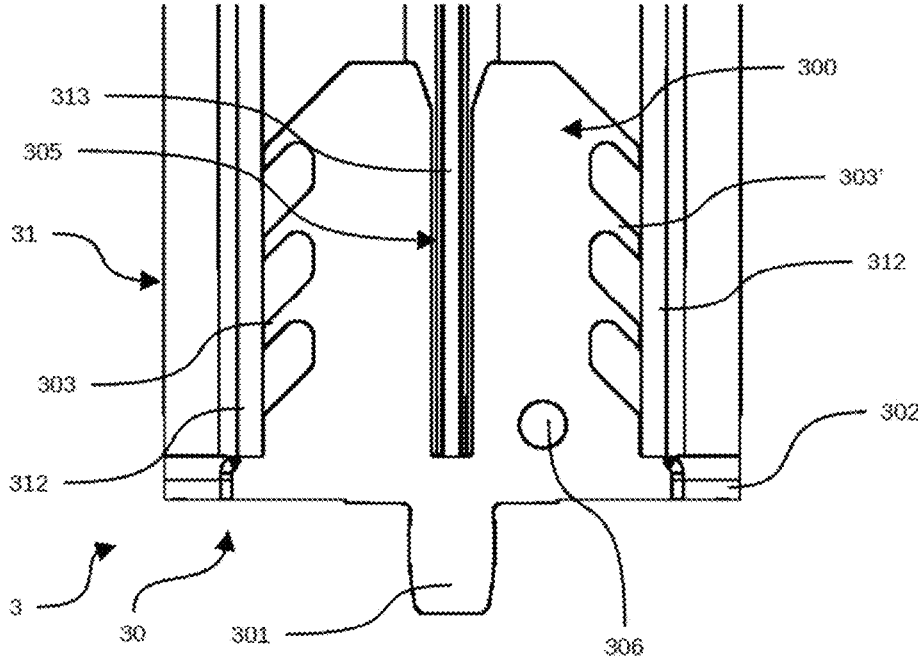
FIG. 6 shows a schematic transverse cross-sectional perspective depiction of a flap end.

As shown in greater detail in FIGS. 5 and 6, the inner portion 300 of the end piece 30 comprises at least one first tooth 303 and one second tooth 303' that are oblique and protrude toward the outside of said inner portion 300. The end of the at least one first tooth 303 is intended to come into contact with one lateral wall 312 of the flap body 31 and the end of the at least one second tooth 303' is intended to come into contact with the other lateral wall 312 of the flap body 31. The teeth 303, 303' are more particularly oriented so that they oppose the removal of the end piece 30 from the flap body 31. To this end, the base of the teeth 303, 303', which connects them to the inner portion 300, is further from the outer portion 301 than the end of said teeth 303, 303'. The ends of the teeth 303, 303' are therefore oriented toward the inner portion 301. When the inner portion 300 of the end piece 30 is inserted into the cavity 311 of the flap body 31, the teeth 303, 303' are thus deformed to allow easy insertion. When a pull-out force is applied to the end piece 30 in order for example to cause it to come out of the flap body 31, the teeth 303, 303' hook onto the lateral walls 312, holding the end piece 30 inside the flap body 31.

In the example illustrated in FIGS. 5 and 6, the end piece 30 comprises two series of three teeth 303, 303' positioned on either side of its inner portion 300. The teeth 303, 303' can in particular be integrally formed with the inner portion 300 of the end piece 30.

These teeth 303, 303' allow a satisfactory connection between the end piece 30 and the flap body 31. This makes it possible to secure the end piece 30 inside the cavity 311 of the flap body 31 and limits the risk of it becoming detached. In addition, these teeth 303, 303', due to their deformation, allow greater manufacturing tolerances between the end piece 30 and the flap body 31 and easy insertion of the end piece 30 inside the flap body 31.

The inner portion 300 of the end piece 30 can also comprise blind recesses 304 that face the inner faces of the outer walls 310 when mounted in the flap body 31. These recesses make it possible in particular to reduce the amount of material forming the end piece 30 and thus make it possible to reduce the weight thereof. The sections forming the inner portion 300 of the end piece 30 can in particular vary in thickness by a value of less than 15% from one section to another. This relatively constant thickness of the sections of the inner portion 300 also makes it possible for the end piece 30 to have relatively uniform thermal inertia.

The inner portion 300 of the end piece 30 can further comprise a locating through-orifice 306 positioned asymmetrically on said inner portion 300. Here, asymmetrically is given to mean that this locating orifice 306 is positioned on one side or the other of the axis of rotation A. This locating orifice 306 makes it possible for example, during an automated mounting process, to determine the direction and orientation of the end piece 30 for mounting.

Figure 7:
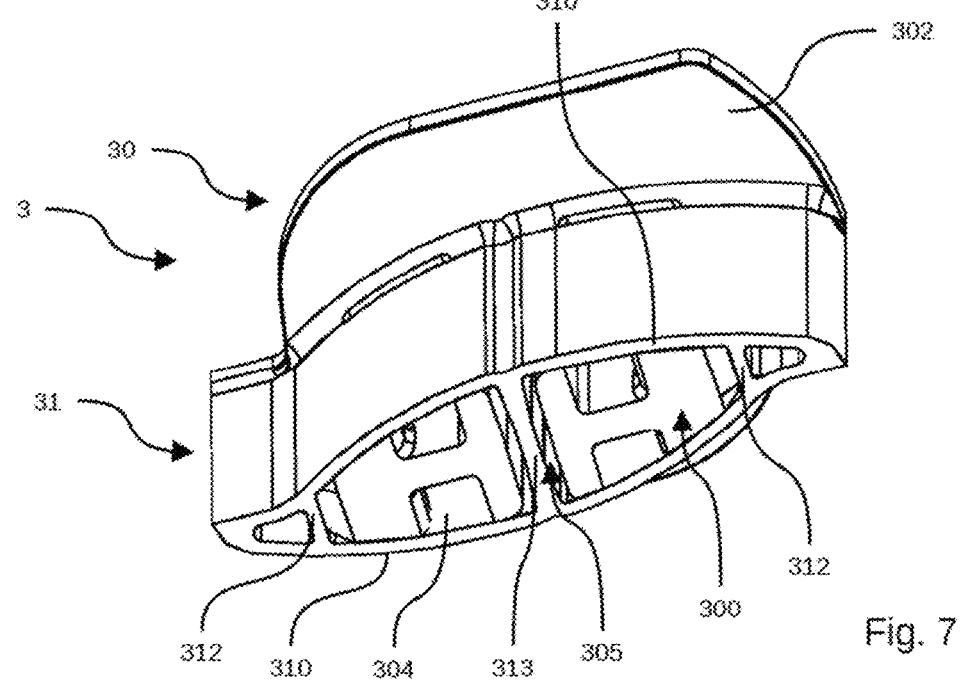
FIG. 7 shows schematic longitudinal cross-sectional perspective depiction of a flap end.

The central channel of the cavity 11 of the flap body 3, into which the inner portion 300 of the end piece 30 is inserted, can also comprise a reinforcing central wall 313 extending along the axis of rotation A, as illustrated in FIGS. 4, 6, and 7. This central wall 313 separates the central channel of the cavity 311 in two. The central wall 313 also makes it possible to stiffen the flap body 31 and in particular to maintain the spacing between the outer walls 310. To this end, this central wall 313 more particularly connects the inner faces of the outer walls 310. As shown in FIGS. 5 to 7, the inner portion 300 of the end piece 30 can in particular comprise a slot 305 for inserting said central wall 313 in order to allow the insertion of the inner portion 300 into the central channel of the flap body 31.

According to FIG. 7, the inner portion 300 of the end piece 30 can comprise at least one support point on each of the inner faces of the outer walls 310 forming the flap body 31. This allows the inner portion 300 in particular and the end piece 30 more generally to have just one degree of freedom along the axis of rotation A. This allows in particular a satisfactory rigid connection between the flap body 31 and the end piece 30. In order to strengthen this rigid connection and limit the movements of the end piece 30 inside the flap body 31 as much as possible, the inner portion 300 of the end piece 30 can in particular have a transverse cross-section whose shape is complementary to complements the shape of the cavity 311 of the flap body 31.

In the example illustrated in FIGS. 4 to 7, only the end piece 30 inserted into the first end of the flap body 31 is shown and described. However, it is entirely possible to envisage that the inner portion 300 of one or the other, or even both, of the end pieces 30, 30', be as described above.

It is thus clear that due to the presence of the lateral walls 312 inside the cavity 311 and of the teeth 303, 303' coming into contact with these lateral walls 312, a satisfactory connection between the end piece 30 and the flap body 31 is possible. This makes it possible to secure the end piece 30 inside the cavity 311 of the flap body 31 and limits the risk of it becoming detached. In addition, these teeth 303, 303', due to their deformation, allow greater manufacturing tolerances between the end piece 30 and the flap body 31 and easy insertion of the end piece 30 inside the flap body 31.

What is claimed is:

1. A flap for a shutter device for shutting off an air inlet of a motor vehicle front end, comprising a profiled oblong flap body, extruded and extending along its axis of rotation, said profiled oblong flap body including two outer walls connected edge-to-edge and defining an inner cavity, said flap further comprising at each end of the profiled oblong flap body an end piece, said end pieces each including an inner portion inserted into the cavity of the profiled oblong flap body and an outer portion protruding from said profiled oblong flap body, wherein the profiled oblong flap body includes, inside its cavity, two reinforcing lateral walls extending parallel to the axis of rotation and connecting the inner faces of the outer walls, the inner portion of at least one end piece including at least one first and one second tooth that are oblique and protrude toward the outside of said inner portion, the end of the at least one first tooth being intended to come into contact with one reinforcing lateral wall and the end of the at least one second tooth being intended to come into contact with the other reinforcing lateral wall, wherein the first tooth is one of a plurality of teeth positioned along the longitudinal direction, wherein the second tooth is one of a plurality of teeth positioned along the longitudinal direction, the at least one first and one second teeth being oriented so that they oppose the removal of the at least one end piece from the profiled oblong body flap.

2. The flap as claimed in claim 1, wherein the reinforcing lateral walls divide the cavity of the profiled oblong flap body into parts including a lateral channel at each edge of the transverse cross-section of the profiled oblong flap body and a central channel positioned between the two lateral channels, the inner portion of the at least one end piece being positioned inside said central channel.

3. The flap as claimed in claim 2, wherein the central channel includes a reinforcing central wall extending along the axis of rotation and connecting the inner faces of the outer walls, said central wall separating the central channel in two, the inner portion of the at least one end piece including a slot for inserting said central wall.

4. The flap as claimed in claim 1, wherein the inner portion of the at least one end piece has a transverse cross-section whose shape is complementary to the shape of the cavity of the profiled oblong flap body.

5. The flap as claimed in claim 1, wherein the inner portion of the at least one end piece includes blind recesses that face the inner faces of the outer walls when mounted in the profiled oblong flap body.

6. The flap as claimed in claim 1, wherein a thickness of the sections forming the inner portion of the at least one end piece varies by a value of less than 15% from one section to another.

7. The flap as claimed in claim 1, wherein the inner portion of the at least one end piece includes a locating through-orifice positioned asymmetrically on said inner portion.

8. The flap as claimed in claim 1, wherein the at least one end piece includes, between its inner portion and its outer portion, a collar protruding perpendicular to the axis of rotation of the flap, said collar closing one of the ends of the profiled oblong flap body.

9. The flap as claimed in claim 1, wherein, at a first end thereof, one end piece includes, on its outer portion, a pivot axis concentric with the axis of rotation and, at a second end, another end piece includes a pivot axis concentric with the axis of rotation and a control arm.

10. A flap for a shutter device for shutting off an air inlet of a motor vehicle front end, comprising a profiled oblong flap body, extruded and extending along its axis of rotation, the profiled oblong flap body including two outer walls connected edge-to-edge and defining an inner cavity, the flap further comprising at each end of the profiled oblong flap body an end piece, the end pieces each including an inner portion inserted into the cavity of the profiled oblong flap body and an outer portion protruding from the profiled oblong flap body, wherein the profiled oblong flap body includes, inside its cavity, two reinforcing lateral walls extending parallel to the axis of rotation and connecting the inner faces of the outer walls, the inner portion of at least one end piece including at least one first and one second tooth that are oblique and protrude toward the outside of the inner portion, the end of the at least one first tooth being intended to come into contact with one reinforcing lateral wall and the end of the at least one second tooth being intended to come into contact with the other reinforcing lateral wall, the at least one first and one second teeth being oriented toward the outer portion so that they oppose the removal of the at least one end piece from the profiled oblong body flap, and wherein the first tooth is one of a plurality of teeth positioned along the longitudinal direction, wherein the second tooth is one of a plurality of teeth positioned along the longitudinal direction.

11. The flap as claimed in claim 10, wherein the reinforcing lateral walls divide the cavity of the profiled oblong flap body into parts including a lateral channel at each edge of the transverse cross-section of the profiled oblong flap body and a central channel positioned between the two lateral channels, the inner portion of the at least one end piece being positioned inside the central channel.

12. The flap as claimed in claim 10, wherein the inner portion of the at least one end piece includes blind recesses that face the inner faces of the outer walls when mounted in the profiled oblong flap body.

13. The flap as claimed in claim 10, wherein the inner portion of the at least one end piece has a transverse cross-section whose shape is complementary to the shape of the cavity of the profiled oblong flap body.

14. The flap as claimed in claim 10, wherein the at least one end piece includes, between its inner portion and its outer portion, a collar protruding perpendicular to the axis of rotation of the flap.

15. The flap as claimed in claim 14, wherein the collar includes an upper collar portion and a lower collar portion, wherein the upper collar portion protrudes laterally from the lower collar portion and the lower collar portion protrudes laterally from the upper collar portion.

16. A flap for a shutter device for shutting off an air inlet of a motor vehicle front end, comprising a profiled oblong flap body, extruded and extending along its axis of rotation, the profiled oblong flap body including two outer walls connected edge-to-edge and defining an inner cavity, the flap further comprising at each end of the profiled oblong flap body an end piece, the end pieces each including an inner portion inserted into the cavity of the profiled oblong flap body and an outer portion protruding from the profiled oblong flap body, wherein the profiled oblong flap body includes, inside its cavity, two reinforcing lateral walls extending parallel to the axis of rotation and connecting the inner faces of the outer walls, wherein a collar is disposed between the inner portion and the outer portion, the collar including an upper collar portion and a lower collar portion, and wherein the upper collar portion protrudes laterally from the lower collar portion and the lower collar portion protrudes laterally from the upper collar portion.

17. The flap as claimed in claim 16, wherein the inner portion of at least one end piece includes at least one first and one second tooth that are oblique and protrude toward the outside of the inner portion.

18. The flap as claimed in claim 17, wherein the end of the at least one first tooth comes into contact with one reinforcing lateral wall and the end of the at least one second tooth comes into contact with the other reinforcing lateral wall.

19. The flap as claimed in claim 18, wherein the first tooth is one of a plurality of teeth positioned along the longitudinal direction, wherein the second tooth is one of a plurality of teeth positioned along the longitudinal direction.

* * * * *